(12) United States Patent
Dickinson et al.

(10) Patent No.: US 6,224,485 B1
(45) Date of Patent: May 1, 2001

(54) HIGH-SCORE DISPLAY SYSTEM FOR A VIDEO GAME

(75) Inventors: Vince Dickinson, Chicago; John R. Newcomer, Arlington Heights, both of IL (US)

(73) Assignee: Midway Amusement Games, LLC, Chicago, IL (US)

( * ) Notice: Subject to any disclaimer, the term of this patent is extended or adjusted under 35 U.S.C. 154(b) by 0 days.

(21) Appl. No.: 09/071,582

(22) Filed: May 1, 1998

(51) Int. Cl.⁷ .................................................. A63F 9/22
(52) U.S. Cl. ................................... 463/30; 463/1
(58) Field of Search .................... 463/1–8, 30–34; 348/13; 700/91–93; 340/323 R

(56) References Cited

U.S. PATENT DOCUMENTS

| | | | |
|---|---|---|---|
| 4,116,444 | 9/1978 | Mayer et al. | 273/101.2 |
| 4,367,876 | 1/1983 | Kotoyori | 273/121 A |
| 4,398,189 | 8/1983 | Pasierb, Jr. et al. | 340/721 |
| 4,441,104 | 4/1984 | Finney, II | 340/724 |
| 4,498,079 | 2/1985 | Ghosh et al. | 340/725 |
| 4,521,014 | 6/1985 | Sitrick | 273/1 GC |
| 4,572,509 | 2/1986 | Sitrick | 273/85 G |
| 4,600,200 | 7/1986 | Oka et al. | 273/313 |
| 4,710,873 | 12/1987 | Breslow et al. | 364/410 |
| 5,720,663 | * 2/1998 | Nakatani et al. | 463/23 |
| 5,768,382 | * 6/1998 | Schneier et al. | 463/41 |
| 5,971,849 | * 10/1999 | Falciglia | 463/16 |

* cited by examiner

*Primary Examiner*—Mark A Sager
*Assistant Examiner*—John M. Hotaling, II
(74) *Attorney, Agent, or Firm*—Jenkins & Gilchrist

(57) ABSTRACT

A high-score display system for a video game includes a memory and a display coupled to a game controller of a video game. The game controller causes the display to show active game play sequences responsive to player inputs and simulated game play during an attract mode. Information associated with prior plays of the video game, including high score player identifiers, are stored in the memory. The controller causes selected ones of the high score player identifiers to be displayed in a plurality of available display areas of the video game including static display areas, movable display areas and conditional display areas.

19 Claims, 3 Drawing Sheets

HIGH-SCORE DISPLAY SYSTEM FOR A VIDEO GAME

FIELD OF THE INVENTION

The present invention relates generally to video games and, more particularly, to video games with high-scorer displays.

BACKGROUND OF THE INVENTION

There are a variety of video games which include high-scorer displays for recognizing players who have achieved a high score in the game. The displays are usually shown in a format in which the names or initials of eligible players, such as the top ten high-scoring players, are displayed in one column and the scores achieved by the respective players are shown in an adjacent column of the video game display. Generally, competitive players enjoy games with high-scorer displays because, for those who have achieved a high score, the displays provide a record of the players' accomplishments and give them bragging rights in a particular game, at least until such time as they are unseated by other competitors. Similarly, for those players not presently on the display, or for those whose scores are on the display but who wish to improve their score or position, the displays identify target scores which must be achieved to surpass the players presently recognized on the display. Generally, it has been found that player competition engendered by high-scorer displays can attract more frequent play of the underlying games and accordingly, where such displays are incorporated in coin-operated video games, greater revenues can accrue to the owner and/or operator of the game.

Nevertheless, in present-day video games incorporating high-scorer displays, the displays are usually shown for only a limited time during operation of the game. In a typical video game, for example, high-scorer displays are shown only during portions of an "attract mode" sequence in which exemplary video displays, user instructions, scoring information and the like are conveyed to potential players, in addition to high-scorer displays, when the game is not in play. The attract mode sequence, and thereby the opportunity to observe the high-scorer display, terminates when a player starts an active game and does not resume until the player completes the game. Thus, especially in frequently-played games, high-scorer displays may be observed for only a small fraction of the operating time of the game.

Accordingly, there is a need for a high-scorer display system for a video game which provides greater opportunities to view high score information, which provides greater recognition to high-scoring players and which may be displayed during active play of the game. The present invention is directed to satisfying these needs.

SUMMARY OF THE INVENTION

In accordance with one aspect of the present invention, there is provided a high-score display system for a video game utilizing a game controller for controlling operation of the video game during active game play. Memory means is provided for storing high score player identifiers associated with players who have achieved high scores in prior plays of the video game. A display is provided for showing game play associated with the video game. The display is operable in response to instructions from the controller to show selected ones of the high score player identifiers in a plurality of available display areas during game play.

In accordance with another aspect of the present invention, there is provided a high-score display system for a video game utilizing a game controller for controlling operation of the video game in an attract mode. Memory means is provided for storing high score player identifiers associated with players who have achieved high scores in prior plays of the video game. A display is provided for showing simulated game play during the attract mode. The display is operable in response to instructions from the controller to show selected ones of the high score player identifiers in a plurality of available display areas during the simulated game play.

In accordance with yet another aspect of the present invention, there is provided a high-score display system for a video game utilizing a game controller coupled to a memory and display. The game controller controls play of a video game responsive to player inputs. The memory contains score information including high score player identifiers (e.g., identifying the top ten players) and their scores obtained in prior plays of the video game. The display shows a game title field and various subsidiary character fields during play of the video game. In one embodiment, a high score player identifier corresponding to the top score in the memory is shown in the game title field and the remaining high score player identifiers are shown in the subsidiary character fields during play of the video game.

BRIEF DESCRIPTION OF THE DRAWINGS

The foregoing and other advantages of the invention will become apparent upon reading the following detailed description and upon reference to the drawings in which.

Figure 1:
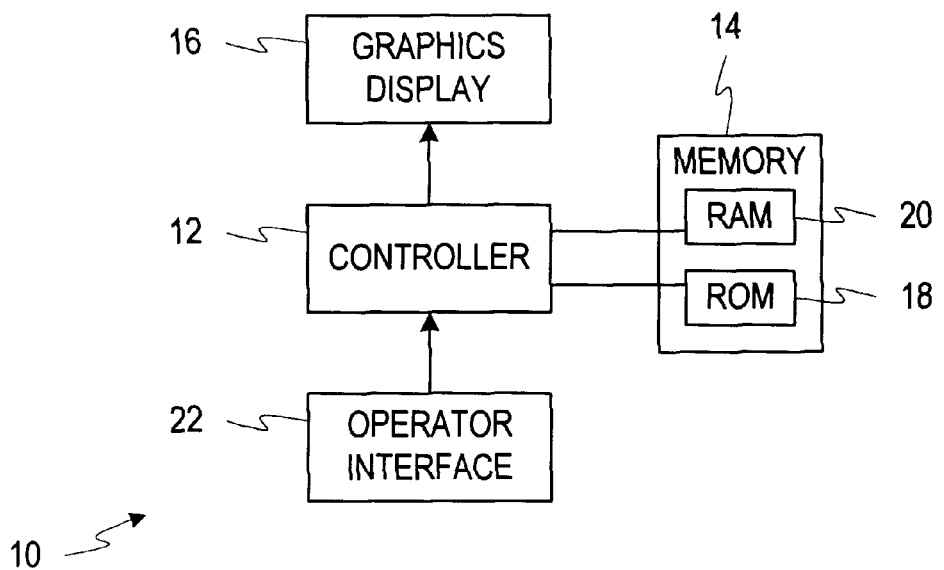
FIG. 1 is a block diagram of a high-score display system for a video game according to one embodiment of the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, there is shown a block diagram of a high-score display system for a video game, designated generally by reference numeral 10, according to one embodiment of the present invention. The high-score display system 10 may be utilized with virtually any type and/or size of video game including, for example, coin operated video games, hand-held video games, microprocessor or PC-driven video games. The high-score display system 10 includes a game controller 12 operably coupled to a memory unit 14 and a graphics display 16. The memory unit 14 stores control software, operational instructions and data associated with the video game display system 10. In one embodiment, the memory unit 14 includes a game memory 18 and a score memory 20. The game memory 18 stores a game code and graphics associated with a video game or group of video games. The score memory 20 contains score information including high score player identifiers and high scores (e.g., top ten players and scores) obtained in prior plays of the video game. The score information may also include dates and/or times associated with the scores in the score memory 20.

In the illustrated embodiment, the game memory 18 comprises a read-only memory (ROM) and the score memory 20 comprises a battery-backed random access memory (RAM). However, it will be appreciated that the game memory 18 and score memory 20 may be implemented on alternative types of memory structures (e.g., hard disk, CD ROM, flash card or any other storage media known in the art) or may be integrated on a single memory structure. The game memory 18, where implemented in ROM, is non-volatile (e.g., its data content is preserved without requiring connection to a power supply) and is generally unalterable while it remains within the video game display system 10. The score memory 20, where implemented in battery-backed RAM, is volatile but retains its data content as long as power is provided, either from an external power source or the battery back-up. The score memory 20 is alterable by the controller 12 when appropriate (e.g., to update the top ten players and scores when a "new" high score is achieved).

The game controller 12 controls play of a video game responsive to player inputs provided through an operator interface 22. The game controller 12 may comprise a microcomputer, microprocessor or any other suitable device for executing control of a video game. The operator interface 22 may comprise any combination of push buttons, joysticks, keypads, touch-screens and the like. The game controller 12 executes control software in the game memory 18 according to the player inputs and communicates the resulting video game play activity including, for example, text, animations and background graphics to the graphics display 16. As will be described in relation to FIGS. 3 and 4, the game controller 12 causes high score player identifiers (e.g., one or more characters identifying high-scoring players) to be displayed on the graphics display 16, along with the video game play activity during active play of the video game and/or during an attract mode sequence simulating active game play. The graphics display 16 may comprise a CRT, LED, LCD, dot-matrix, or any other type of display known in the art.

Figure 2:
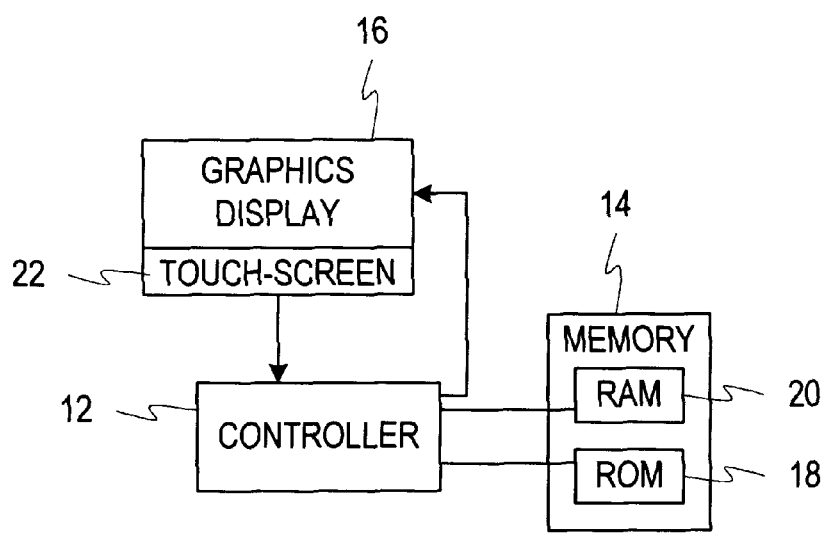
FIG. 2 is a block diagram of a high-score display system for a video game according to another embodiment of the present invention.

FIG. 2 illustrates a video game display system 10 including a controller 12 coupled to an operator interface 22 and graphics display 16, in which the operator interface 22 comprises a touch-screen electrically coupled to the display 16. A memory 14, including a game memory 18 and a score memory 20, is coupled to the controller 12 in substantially the same manner as in FIG. 1. The controller 12 executes control software in the game memory 18 according to the player inputs in substantially the same manner as in FIG. 1, with the exception that player inputs are provided by touching the touch screen 22 at touch points above various "keys" or key outlines or other specified areas on the display 16.

The controller 12 may be programmed to display the various "keys" or key outlines (not shown) on the graphics display 16 and to recognize the locations of the "keys," key outlines, or other specified areas of the graphics display 16 according to control software in the game memory 18. The "keys" or key outlines, if used, may be displayed both during attract mode and during active play of the game. The "keys" may simulate the appearance of an actual key or may comprise game symbols and/or characters shown on the graphic display 16. For example, in a video card game using a simulated deck of playing cards, key outlines may comprise areas of the display 16 on which playing card(s) are displayed.

The touch screen 22 defines an X-Y matrix of touch responsive points positioned adjacent to and overlying the "keys" of the display 16. In one embodiment, the touchscreen 22 comprises a ClearTek® capacitive touchscreen, commercially available from MicroTouch Systems, Inc., Methuen, Mass. It will be appreciated, however, that other types or models of touchscreens known in the art may be used. In the ClearTek® touch screen 22, voltage is applied to the four corners of the touch screen to create a uniform voltage field about the touch screen 22. When pressure from a finger or stylus is applied to a selected touch point of the touch screen 22, current is drawn from the sides of the touch screen 22 in proportion to the distance of the touch point from the edge of the touch screen. A touch screen controller (not shown) evaluates the current flow to detect the coordinates of the touch point. The game controller 12 determines whether the touch point coincides with any "key(s)" on the underlying display 16 and, if so, performs a function or functions (e.g., a designated game activity) associated with that displayed "key." Thus, pressing the touch screen 22 at a location above a displayed "key" outline causes the game controller 12 to perform the function associated with that displayed "key." Hereinafter, references to pressing a displayed key denote that an operator is pressing the touch screen 22 at a location above the displayed key outline.

In a video game, pressing of a particular "key" generally causes the game controller 12 to trigger display of game activity on the graphic display 16. The game activity may cause the game controller 12 to periodically redefine key outlines, displays and/or functions associated with the game. For example, in a video card game using a simulated deck of playing cards, the controller 12 may cause a key outline associated with the deck position to initially display a "face down" card and, as a result of game activity, change the display to that of a "face up" card in the deck. In this example, pressing the touch screen above the key outline while the "face down" card is displayed may cause the controller 12 to perform a different function than it would perform if the "face up" card is displayed.

Figure 3:
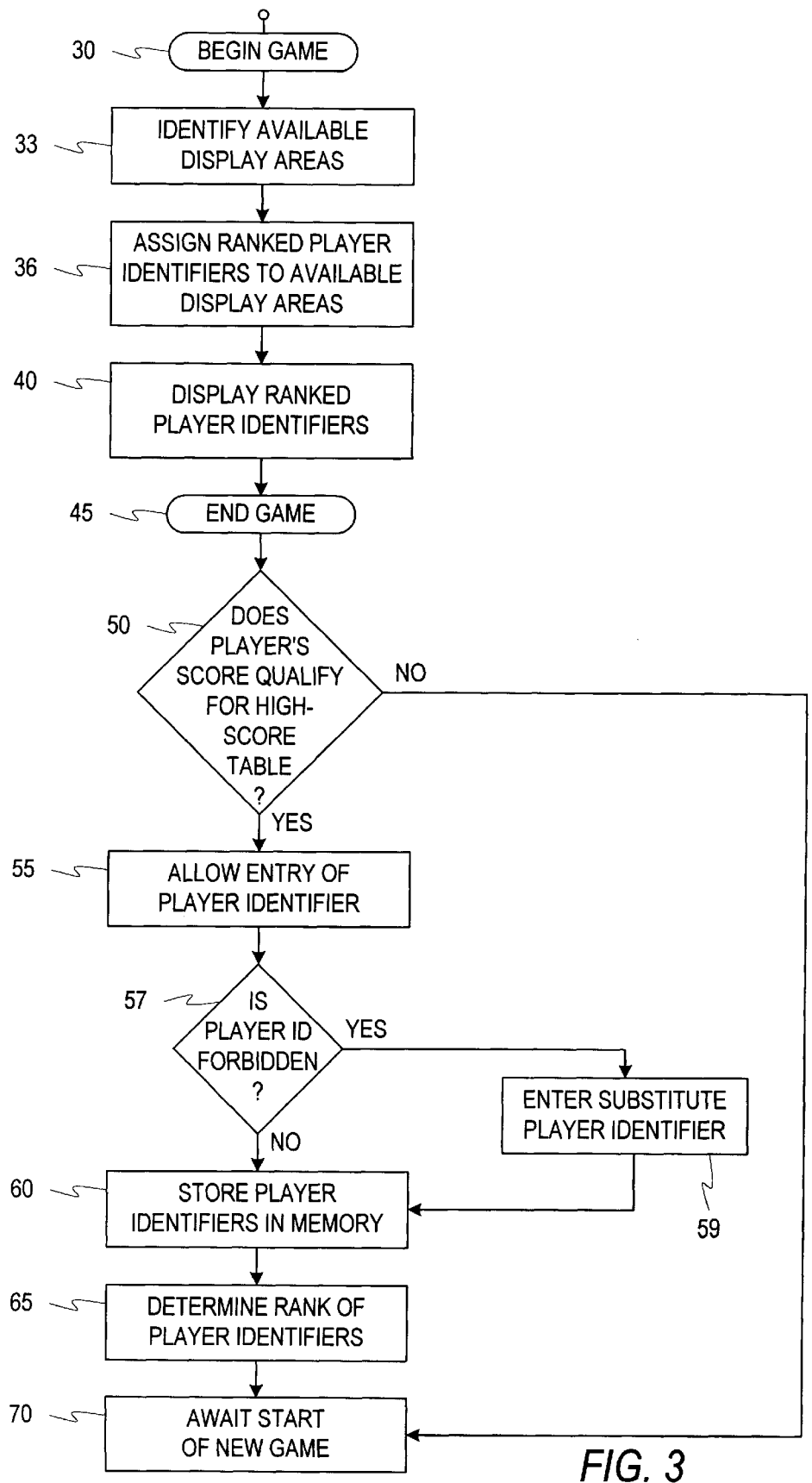
FIG. 3 is a flow diagram showing various aspects of operation of the high-score display system according to one embodiment of the present invention.

Now turning to FIG. 3, there will be described various aspects of operation of the high-scorer display system 10 of the present invention. In step 30, the player begins a game. This may be accomplished by depressing a designated start game "key" on the touch-screen 22, depressing a button, or by any other standard means. In embodiments offering a choice of a plurality of different games, a game selection "menu" may be provided in which the player selects a particular game. In such embodiments, the start of the game may be accomplished coincident to the selection of the game from the game selection menu or by depressing a separate start game "key," outside of the game selection menu. Upon beginning a selected game, the controller 12 causes the display 16 to exit the "attract mode" and to display video game play activity associated with the selected game. The video game activity may include, for example, text, animations, background graphics and, in a touch-screen embodiment, key outlines associated with the selected game.

In step 33, the controller 12 identifies a number of display areas which are available to display items of score information obtained from score memory (e.g., high score player identifiers and/or high scores). Typically, the available display areas for any particular game are predetermined according to a game program. Accordingly, the step of identifying available display areas is normally accomplished by the controller coincident to execution of the game program. Alternatively or additionally, the display areas may be randomly selected by the controller. The available display areas might also be selected in response to player inputs or by any other suitable means. Generally, the available display areas may include any combination of movable display areas, static display areas and conditional display areas.

Movable display areas are those which are movable in response to game activity (or, in an attract mode sequence, simulated game activity). For example, in games including animated characters (e.g., athletes, vehicles, etc.), movable display areas may be defined on the characters themselves (or portions thereof), or on areas of the screen adjacent to the characters. The characters may be controllable in response to player inputs during play of the game (or controllable according to instructions from a game controller to simulate an active game). Movable display areas may be utilized, for example, in a video basketball game in which the player controls one or more animated basketball players, or in a racing game in which the player controls a racing vehicle such as an automobile. In the basketball game, high score player identifiers might be displayed either on or adjacent to the various basketball players, thereby "naming" one or more of the animated players with player identifier(s) designated by the previous high-scoring video game player(s). In the racing game, high score player identifiers might be displayed on or adjacent to one or more of the animated racing vehicles (on a license plate, for example), such that a player identifier on a particular vehicle would connote ownership of the vehicle or identify the driver of the vehicle.

Static display areas are those which are fixed to a particular area of the display and remain visible during play of the game (or during an attract mode sequence simulating play of the game). Conditional display areas define display areas which are tied to particular background structures or events occurring in the game (or simulated game) and are displayed upon the occurrence or display of such structures or events, but otherwise are obscured or not displayed. Such conditional display areas, when displayed, ordinarily are fixed to a particular area of the display. In a video basketball game, for example, portions of the basketball court, crowd scenes, banners, etc. may define static or conditional displays to be shown during play of the video game and/or in an attract mode sequence simulating play of the game. Similarly, in a video racing game, street signs, business names, banners, etc. might be used as static or conditional displays during play of the video game. It will be appreciated, however, that such examples are merely illustrative of the types of displays which may be utilized with the present invention and are not to be construed as limiting the scope of the present invention.

In step 36, the controller assigns ranked player identifiers to the available display areas then, in step 40, the controller causes the display to display the ranked player identifiers. The controller obtains the high score player identifiers from a high score table in game memory 20. The score information to be displayed (e.g., the high score player identifiers) may be shown in any combination of the available display areas, comprising any combination of movable, static and/or conditional display areas. In one embodiment, the assignment of player identifiers is predetermined according to the game program. For example, execution of the game program might cause the controller to assign the top ranked player identifier to a first designated display area; assign the second ranked player identifier to a second designated display area, and so on. Alternatively, the controller might randomly assign the player identifiers to one or more available display areas and/or the controller might assign more than one player identifier to a particular display area.

When the game has ended (step 45), the controller 12 determines in step 50 whether the most recent player's score qualifies for the high score table. If the most recent score does not qualify for the high score table, the controller 12 proceeds to step 70 to await the start of a new game, during which time the controller 12 may display an attract mode sequence until a new game is started (step 30). If the controller determines that the most recent score qualifies for the high score table, it prompts the qualified player to enter a player identifier (step 55). The player then enters a player identifier, comprising a predetermined number of characters (typically eight), from the operator interface 22, which may comprise a numeric keypad, joystick, touch screen display or the like.

In step 57, the controller 12 compares the entered high score player identifier to a list of forbidden words stored in game memory 18. If the controller 12 determines that the player identifier is forbidden, it enters a substitute player identifier (step 59), then stores the substitute player identifier in the score memory 20 (step 60). Otherwise, if the player identifier is not forbidden, the controller 12 stores the player identifier entered by the player in a high score table in score memory 20 (step 60).

In step 65, the controller determines the rank of the high score player identifiers in the high score table in view of the newly entered score. Where the high score table is limited to a designated number (e.g., a "top ten" list) of names and associated scores, the controller in step 65 may remove the lowest ranking score (e.g., the tenth-ranked score) from the list to make room for the most recent score in the high score table. The ranking of scores in the high score table generally determines where and when they will be shown in the display during subsequent plays of the game. For example, if the newly entered score is higher than the previous highest score, the game controller will rank the new score as #1 and drop the previous highest score from #1 to #2. Then, upon subsequent plays of the game, if in step 36 the top ranked player identifier is to be assigned to a first designated display area, the game controller 12 will assign the player identifier associated with the new #1 score to the first designated display area until it becomes displaced by an even higher score. Similarly, if in step 36 the second ranked player identifier is to be assigned to a second designated display area, the game controller 12 will assign the player identifier associated with the new #2 (formerly #1) to the second designated display area.

In step 70, the controller 12 awaits the start of a new game, during which time the controller 12 may return to a game selection menu and/or display an attract mode sequence until a new game is started (step 30). The attract mode sequence may include a display of high score player identifiers in the game title field or background graphics in a simulated "active" game sequence replicating or simulating steps 33, 36 and 40.

In embodiments offering a plurality of different games, a plurality of high scorer tables may be maintained in the score memory 20, each corresponding to one of the available games. In the flowchart of FIG. 3, each reference to a high score table shall be construed as referring to the high score table associated with the particular game started in step 30. Thus, references to "ranked player identifiers" in steps 36 and 40 shall be construed as referring to player identifiers obtained in previous plays of the particular game started in step 30. Similarly, where the controller 12 allows entry of a player identifier (step 55), stores high score player identifiers in a high score table (step 60) or ranks the high score player identifiers in the high score table (step 65), it is storing or ranking the high score player identifiers, respectively, in the high score table associated with the game started in step 30. Consequently, the high score player identifiers displayed in any one of the games will correspond to the high scores achieved in that particular game.

Figure 4:
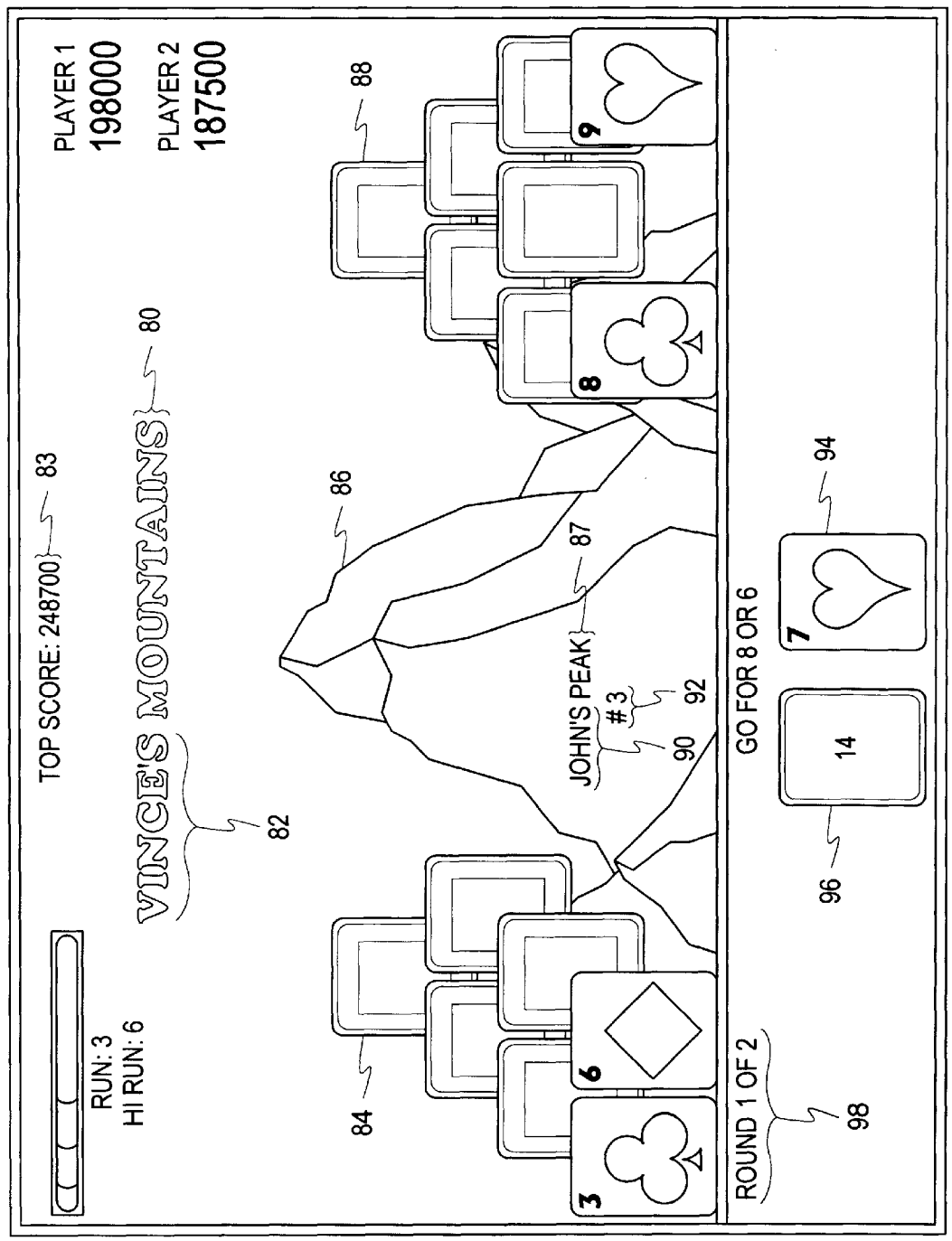
FIG. 4 is a front view of a display screen of an exemplary video game implementing the high-score display system according to one embodiment of the present invention.

Now turning to FIG. 4, there is shown a display of a video game entitled 3 PEAK DELUXE™ which is useful for describing one manner of implementing the present invention. The 3 PEAK DELUXE™ game is commercially available from the assignee of the present invention, Midway Games Inc. of Chicago, Ill. It will be appreciated, however, that the present invention is not limited to the 3 PEAK DELUXE™ game or any other specific video game.

Upon start of the game, the display 16 shows a number of playing cards, initially arranged in a pattern of three "triangles," two of which are shown in FIG. 4 and designated by reference numerals 84, 88. During play of the game, cards are removed from the triangles to expose a series of mountain peaks, one of which is shown in FIG. 4 and designated by reference numeral 86. The object of the 3 PEAK DELUXE™ game is to remove all of the cards from the playfield. Cards may be removed if they have a value which is one higher or one lower than the value of a "deck card" 94. As a card is removed from the playfield, it becomes the new deck card 94 from which the next play is made. If there are no cards on the playfield one higher or lower than the deck card 94, the player can touch the deck 96 (or, more particularly, the touchscreen over the deck 96) to obtain the next card. The player wins the round, and advances to the next round, if all of the cards on the playfield are removed before running out of cards in the deck. In one embodiment, the game includes three rounds—a first round, a second round and a bonus round, each of which displays a pattern of cards and a series of mountain peaks behind the cards.

One of the available display areas for displaying high score player identifiers in the 3 PEAK DELUXE™ game is a game title field 80. The game title field 80 is a static display area because it remains visible during each round of game play and is generally fixed to an upper central portion of the display 16. The game title field 80 may be displayed during active play of the video game or during an attract mode sequence when the video game is not in active play. In one embodiment, the controller assigns the top-ranked player identifier from score memory in the game title field 80, after first supplementing the top-ranked player identifier with the predefined suffix ". . . 'S MOUNTAINS." Specifically, the game title field 80 in FIG. 4 shows the character string "VINCE'S MOUNTAINS." The name "VINCE" in the game title 80 is the top-ranked player identifier 82 obtained from score memory 20, entered by the player who had achieved the highest previous score in the game. The score achieved by the player in the game title field is shown in a top score field 83. The top score field 83, like the game title field 80, is a static display area which is fixed to a particular area of the display and remains visible during play (and/or during simulated play). Accordingly, in the illustrated embodiment, high score information including a top-ranked player identifier and score are continually displayed in the game title field 80 and top score field 83.

In one embodiment of the 3 PEAK DELUXE™ game, as the mountain peaks become exposed upon removal of cards, the controller causes other high score player identifiers to be displayed on the mountain peaks in subsidiary character fields. In FIG. 4, for example, there is shown a subsidiary character field 87 associated with mountain peak 86. In the event the triangles 84, 88 are removed during play, the controller 12 will reveal the display of two other mountain peaks, each including an associated subsidiary character field on which high score player identifiers may be displayed. Each round of the game includes three mountain peaks and associated subsidiary character fields which may be revealed during play (or simulated play), thus defining nine subsidiary character fields which may be utilized to display high score player identifiers. The nine subsidiary character fields are conditional display areas inasmuch as they are fixed to the areas of the display behind respective triangles of cards and are displayed only when game activity in each respective round causes cards to be removed from the triangles. The subsidiary character fields may be displayed during active play of the video game or during an attract mode sequence when the video game is not in active play.

In one embodiment, where the top-ranked player identifier is displayed in the game title field 80, the controller causes the second- through tenth-ranked player identifiers to be displayed in the subsidiary character fields. Specifically, in such embodiment, the controller causes the subsidiary character fields associated with the three peaks in round 1 to display high score player identifiers associated with the #2, #3 and #4 highest scores, the subsidiary character fields associated with the three peaks in round 2 to display high score player identifiers associated with the #5, #6 and #7 highest scores and the subsidiary character fields associated with three peaks in the bonus round to display high score player identifiers associated with the #8, #9 and #10 highest scores.

In FIG. 4, a round identifier 98 indicates that the game is in "ROUND 1 OF 2" and, therefore, the subsidiary character field "behind" triangle 84 is adapted to display the high score player identifier associated with the second highest score in game memory, the subsidiary character field 87 associated with peak 86 displays the high score player identifier associated with the third highest score in game memory and the subsidiary character field "behind" triangle 88 is adapted to display the high score player identifier associated with the fourth highest score in game memory. Specifically, in the embodiment shown in FIG. 4, the subsidiary character field 87 includes the character string "JOHN'S PEAK." The name "JOHN" in the subsidiary character field 87 is a player identifier 90 entered by the player who had achieved the third-highest score in the game, whereas the suffix ". . . 'S PEAK" is a predefined character string, similar to the suffix ". . . 'S MOUNTAINS" added to the highest ranked player identifier. A rank identifier 92 ("#3") identifies the rank of JOHN's score.

It will be appreciated that a variety of other display schemes may be utilized. Generally, any selected one or more of the player identifiers may be assigned to any combination of the available display areas. For example, an alternative display scheme might not show any player identifier(s) in the game title field, or might show high score player identifier(s) other than the top-ranked player identifier in the game title field during portions of the game or portions of the attract mode sequence. Still another display scheme may show the top-ranked player identifier in areas other than the game title field (such as, for example, in one or more of the subsidiary character fields) during portions of the game or portions of the attract mode sequence. Other alternative display schemes might show greater or fewer than the "top ten" high score player identifiers, display different numbers of high score player identifiers in each round and/or display different numbers of high score player identifiers in each display area. Further, other display schemes may integrate the top-ranked player identifier with other predefined characters, or may assign and display the player identifiers to display fields without supplementing them with any predefined characters.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A video game high-score display system comprising:
a game controller for controlling play of a video game responsive to player inputs;
memory means coupled to the game controller, the memory means containing information associated with prior play of the video game; and
a display coupled to the game controller, the display including a game title field adapted to show one or more characters during play of the video game, the characters including an item of information obtained from said memory means, wherein the information associated with prior play of the video game in the memory means comprises one or more high score player identifiers entered by players who have achieved high scores in said prior play of the video game, the item of information included in the game title field comprising one of the high score player identifiers.

2. The high-score display system of claim 1 wherein the item of information included in the game title field comprises the high score player identifier entered by a player having achieved a highest score in said prior play of the video game.

3. The high-score display system of claim 1 wherein the information associated with prior play of the video game in the memory means comprises a heirarchy of high score player identifiers and a corresponding heirarchy of scores achieved in said prior play of the video game, the item of information included in the game title field comprising the high score player identifier associated with a highest one of said scores.

4. The high-score display system of claim 3 wherein the heirarchy of high score player identifiers comprises a top ten list of high score player identifiers.

5. The high-score display system of claim 3 wherein the display is adapted to show each of the heirarchy of high score player identifiers during play of the video game.

6. The high-score display system of claim 3 wherein the display includes a plurality of subsidiary character fields each adapted to show one or more of the high score player identifiers.

7. The high-score display system of claim 6 wherein the subsidiary character fields are hidden upon initial play of the video game and revealed upon selected outcomes of the video game.

8. A high-score display method for a video game, the method comprising the steps of:
identifying high scores achieved in a video game;
obtaining high score player identifiers associated with the high scores;
storing the high score player identifiers and associated high scores in a memory means operably coupled to a game controller;
recalling under control of a game controller a number of the high score player identifiers from the memory means;
assigning a highest ranked player identifier to a game title field; and
displaying the highest ranked player identifier in the game title field.

9. The method of claim 8 wherein the step of displaying the highest ranked player identifier in the game title field is accomplished during active play of the video game.

10. The method of claim 8 wherein the step of displaying the highest ranked player identifier in the game title field is accomplished during an attract mode sequence of the video game.

11. The method of claim 8 wherein the step of assigning high score player identifiers to a number of available display areas further comprises assigning a number of other ranked player identifiers to subsidiary character fields, the step of displaying high score player identifiers comprising displaying the highest ranked player identifier in the game title field and displaying the other ranked player identifiers in the subsidiary character fields.

12. The method of claim 11 wherein the subsidiary character fields associated with the other ranked identifiers are obscured upon initial play of the video game and revealed upon selected outcomes of the video game.

13. A video game high-score display system comprising:
a game controller for controlling operation of a video game;
memory means for storing high score player identifiers associated with players who have achieved high scores in prior plays of the video game; and
a display for showing game play associated with the video game, the display being operable in response to instructions from the controller to show a plurality of the high score player identifiers in a plurality of available display areas during said game play; wherein the plurality of available display areas includes a static display area, the display being operable in response to instructions from the controller to show one of the high score player identifiers in the static display area during said game play; wherein the static display area comprises a game title field.

14. The system of claim 13 wherein the plurality of available display areas includes a movable display area, the display being operable in response to instructions from the controller to show one of the high score player identifiers in the movable display area during said game play.

15. The system of claim 14 wherein the movable display area is associated with a character adapted for movement during said game play.

16. The system of claim 15 wherein the movable display area comprises a portion of the character.

17. The system of claim 15 wherein the movable display area comprises a portion of the display adjacent to the character.

18. The system of claim 13 wherein the plurality of available display areas includes a conditional display area, the display being operable in response to instructions from the controller to show one of the high score player identifiers in the conditional display area during said game play.

19. The system of claim 18 wherein the conditional display area comprises a character field adapted for display during portions of said game play.

* * * * *